July 29, 1941.    C. H. DOOLEY    2,250,754
TRACTOR SAFETY CONTROL
Filed Dec. 20, 1939    6 Sheets-Sheet 1
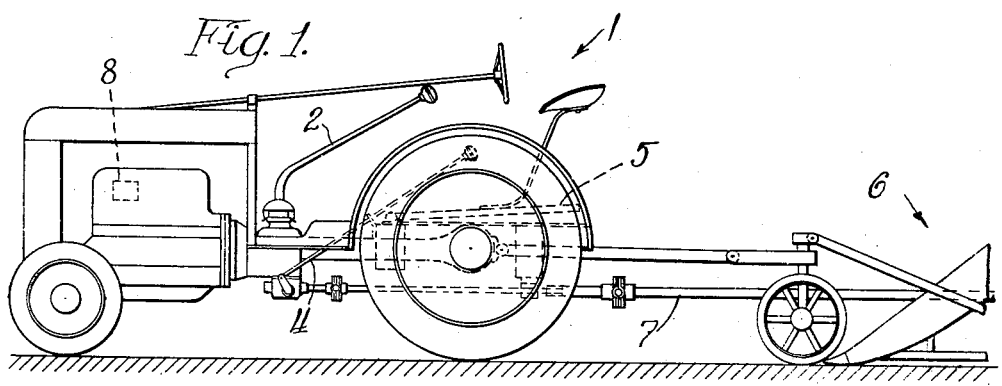
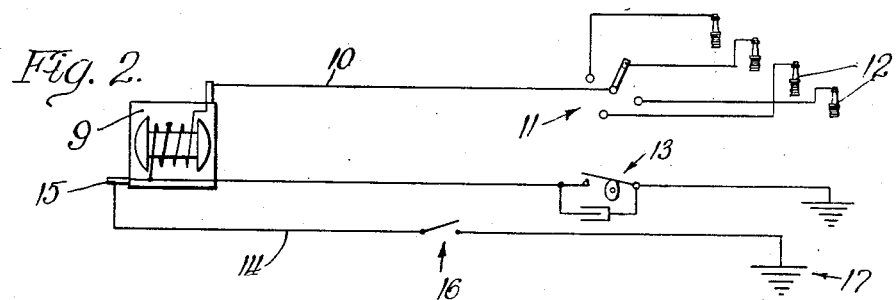
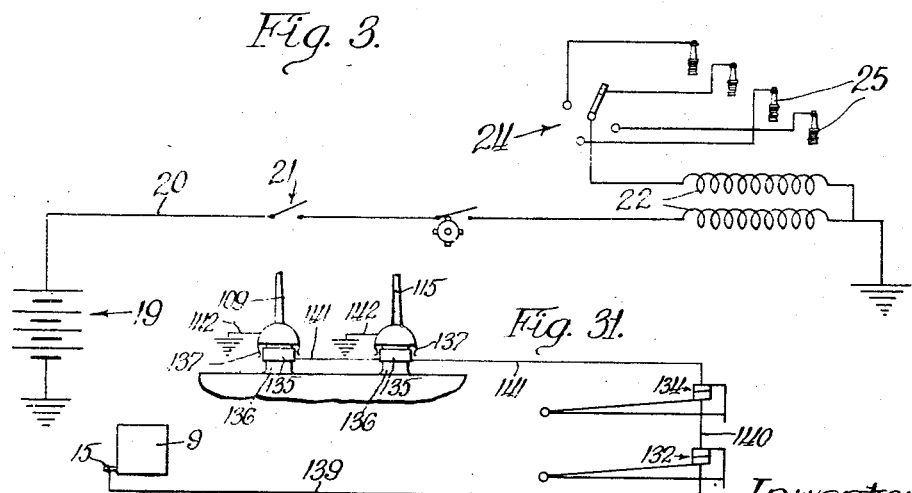
Inventor:
Clarence H. Dooley
Att'ys

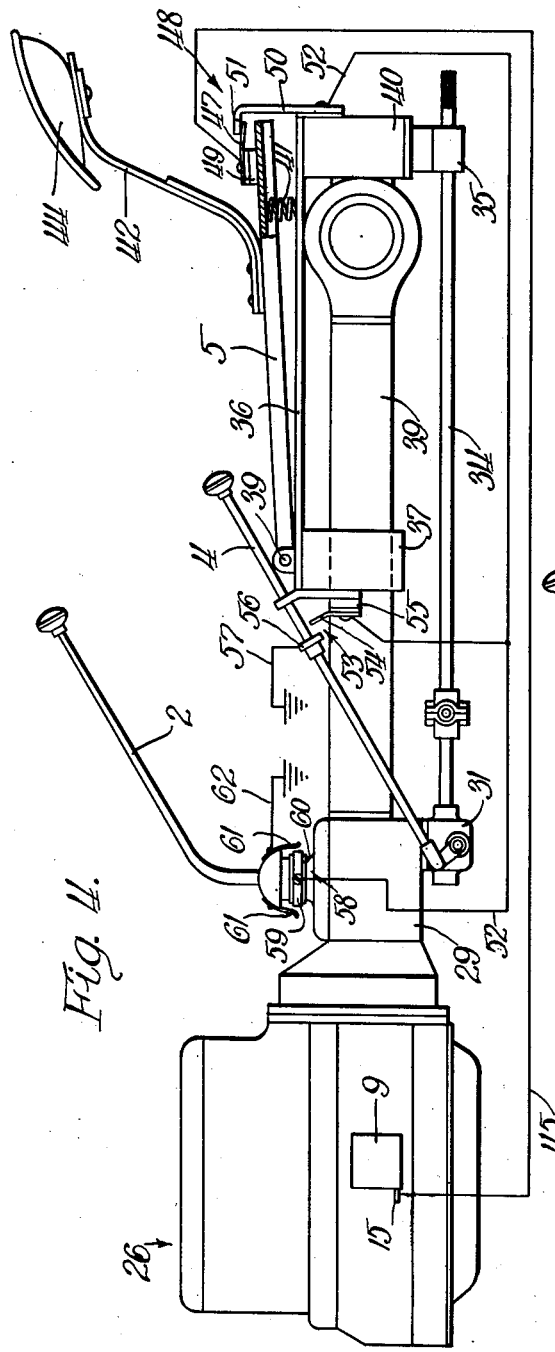
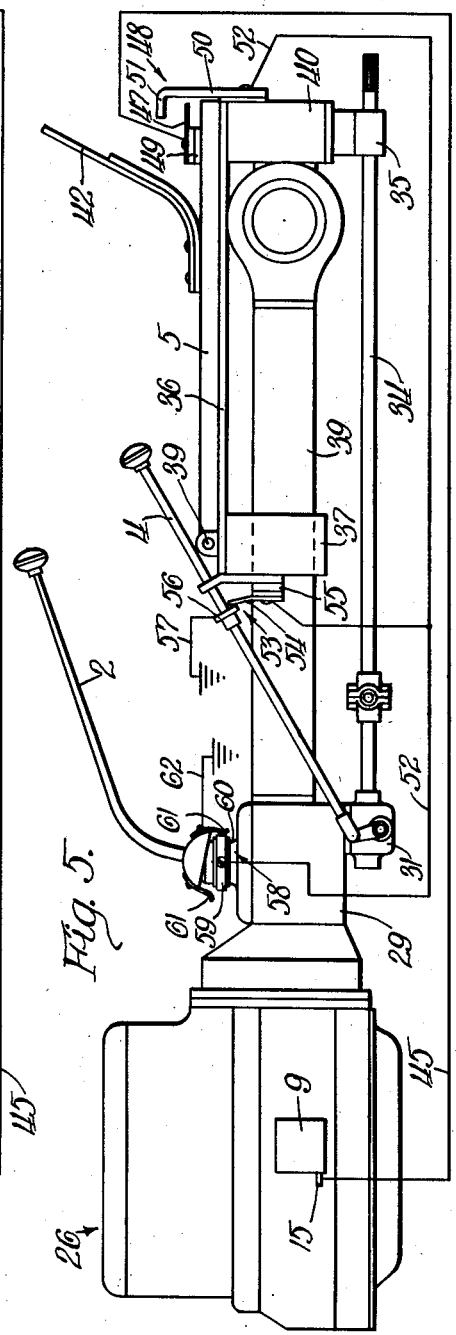

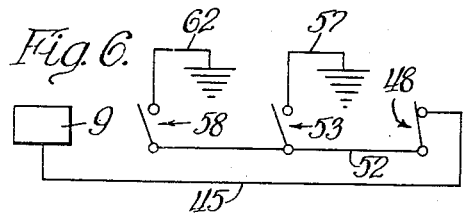
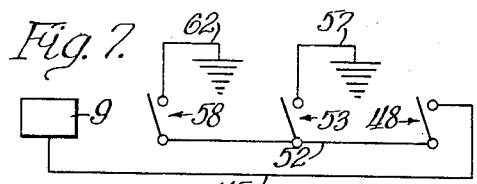
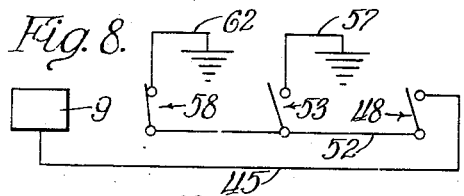
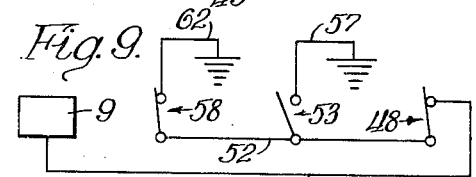
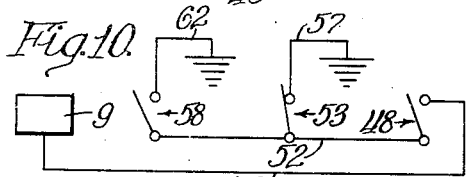
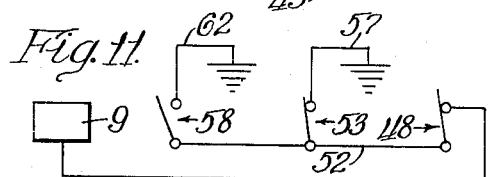
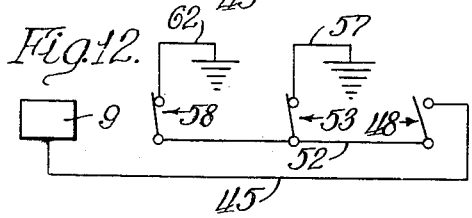
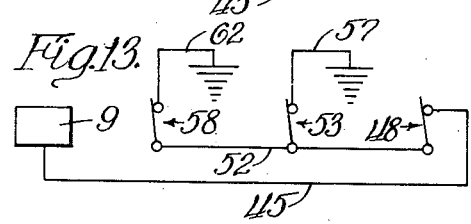
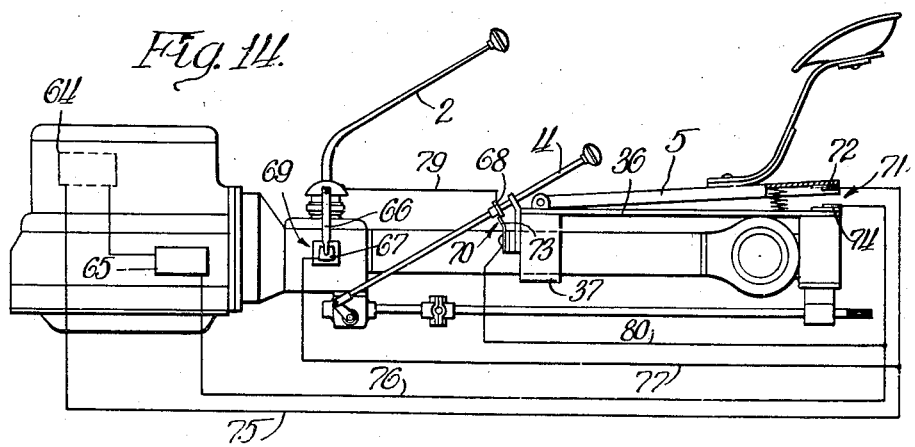
Inventor:
Clarence H. Dooley

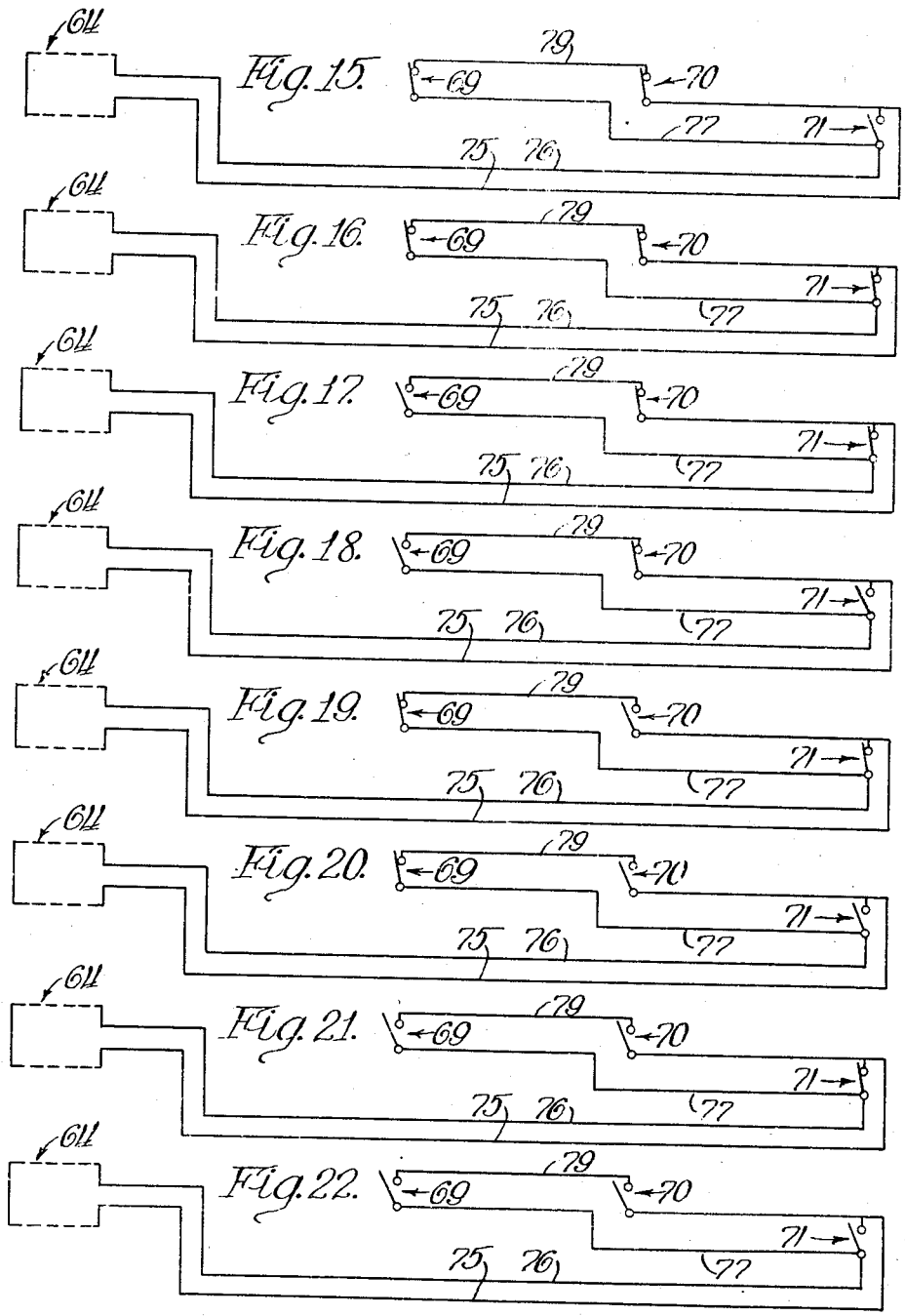

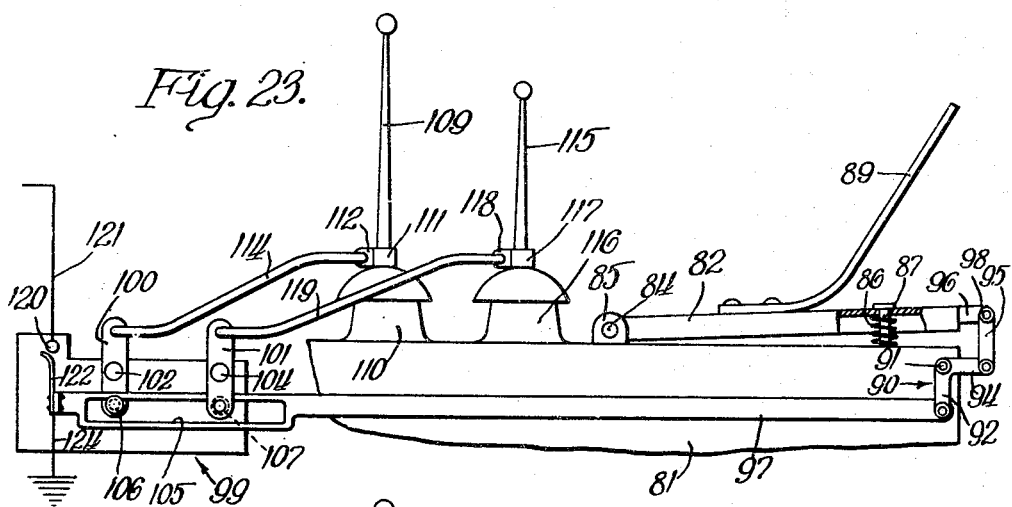
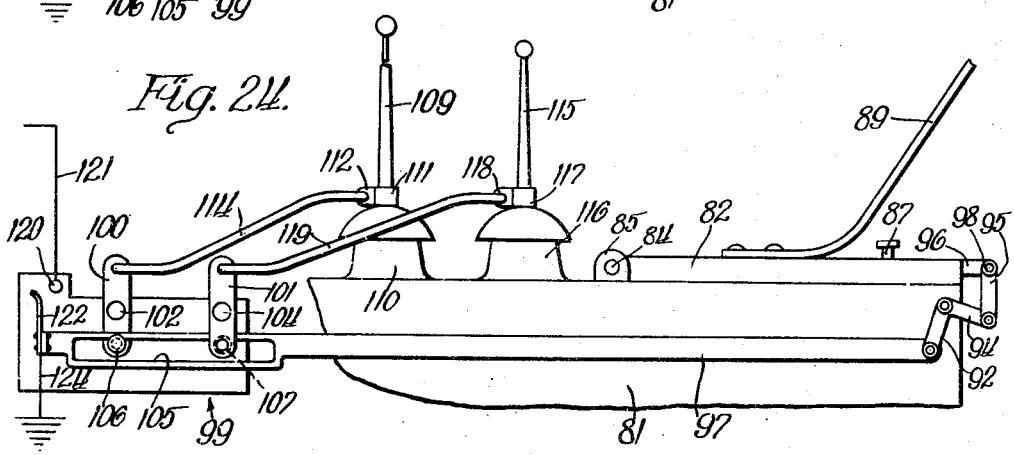
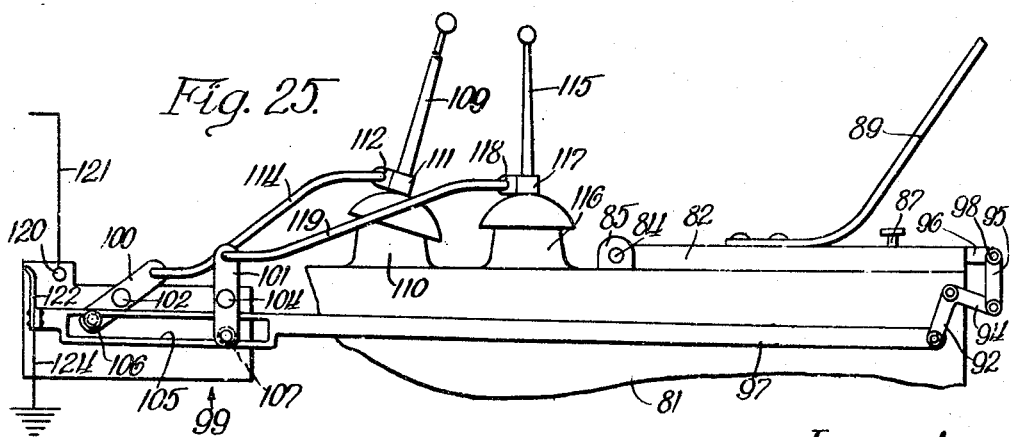

July 29, 1941.  C. H. DOOLEY  2,250,754
TRACTOR SAFETY CONTROL
Filed Dec. 20, 1939  6 Sheets-Sheet 6
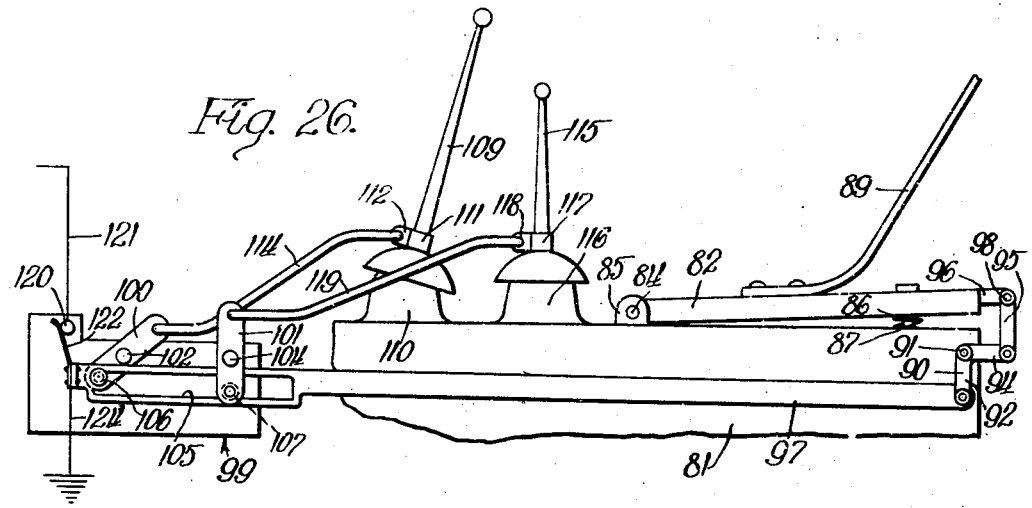
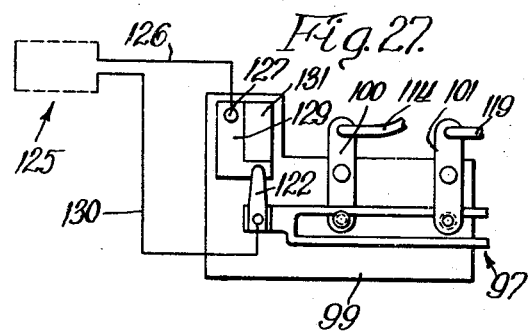
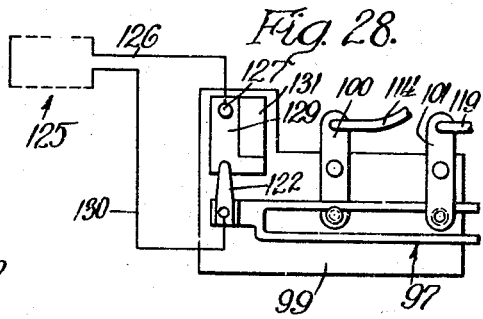
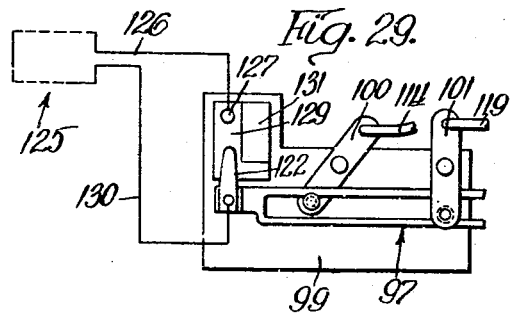
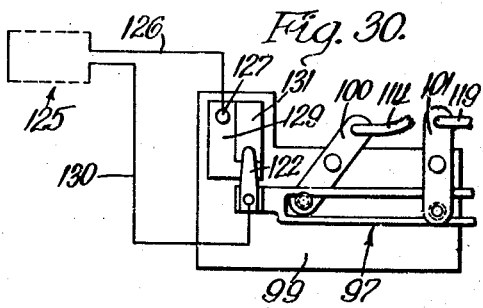
Inventor:
Clarence H. Dooley
By Braun, Jackson, Boettcher, Denver
Attys Patented July 29, 1941

2,250,754

UNITED STATES PATENT OFFICE 2,250,754

TRACTOR SAFETY CONTROL

Clarence H. Dooley, Rock Island, Ill., assignor of one-third to himself, one-third to Delmar D. Dooley, Rock Island, Ill., and one-third to H. Keith Dooley, Los Angeles, Calif.

Application December 20, 1939, Serial No. 310,124

22 Claims. (Cl. 180—82)

The present invention relates to safety control means for tractors.

The invention is particularly applicable to the problem of preventing injury to the operator of a tractor under governor control, as for driving or pulling a dead load or substantially a dead load. While the invention has particular application to the above specific problem, the invention has application in other situations and the scope of the invention is not to be limited to the particular embodiment herein illustrated and described but is to be determined from the appended claims.

In the operation of agricultural implements such as plows, harrows, disk harrows, cultivators and the like, the load is a dead load, i. e., the resistance to progress is usually greater than the momentum of the tractor and the implement. There is usually an optimum speed at which such implements are operated, and adherence to that speed is desirable in order to perform the work with dispatch. Since the operator cannot foresee changes in resistance of the implements, he cannot be expected to operate the throttle according to the load to keep up the speed desired. In fact the changes of resistance to the load are frequently so pronounced that if the operator were required to adjust the throttle, he frequently could not prevent the tractor from stalling. Hence, it is common to employ a governor which automatically adjusts the throttle to the resistance of the load, thereby relieving the operator of that duty.

While the governor relieves the operator of the onerous duty of regulating the power output to the resistance of the load, it introduces two hazards which, although they are not generally noticed, are serious threats to life and limb and have resulted in many serious and not infrequently fatal accidents to the operator. These hazards are as follows:

1. If the tractor is left in gear and is under the control of the automatic throttle governor, and should the operator then crank the engine, the tractor is likely to leap upon him (the throttle being wide open) and injure or crush him. Obviously the tractor should not be left in gear, but in commercial tractors now in use by the thousands there is no provision adequate to guard the operator against this mischance.

2. If, in the normal operation of the tractor pulling an implement, the operator should for any reason fall, slide, or be bounced off the seat and fall in front of the implement, it would run over him and, in all probability, mangle or kill him. This occurrence is not unknown what with operating on side hills over rough soil, obstructions and the like. Sometimes illness or other causes may suddenly disable him.

These hazards are not found in the operation of the usual road vehicle such as an automobile, bus, or truck, for the reason that conditions and means are entirely different. While it is true that trucks may have speed governors, they operate not to keep up a minimum speed as does the tractor, but to prevent speed above a predetermined maximum. Such vehicles as automobiles, busses and trucks for transportation purposes operate upon rolling loads. The work of the engine is exerted in keeping up the forward speed and momentum—not in displacing or cutting the soil as does the tractor.

Such road vehicles also, it is to be particularly observed, have foot pedal, "accelerator," control of a nature such that, the moment the operator's foot leaves the accelerator pedal or button, the throttle closes down to a point where the engine will deliver no more power than that which will keep itself turning over.

Also it is to be particularly observed that the driver of a road vehicle is lodged in a comfortable and roomy seat with a back rest, and housed in a body or cabin from which he cannot fall in case of sudden disability. Neither is there any invitation in the circumstances for the operator of a road vehicle to leave his driving station and try to make some adjustment of or on the tractor or operated implement, or to pull some obstruction out of the tractor or implement, as there is to the operator of the tractor and farm implement.

The seat and platform of the farm tractor are generally open and unguarded. The operator desires freedom to make adjustments of the implement and freedom to observe the operation of the implement being drawn or operated.

Also, the operators of farm tractors do not have the advantages of a training in safety as do many operators of commercial vehicles, particularly busses or trucks.

Now, what has been said above in regard to the operation of earth working implements applies to harvesting implements and also particularly to such implements as harvesters or pickers as employ a power take-off for performing work in addition to the work done by the tractor in moving the tractor and hauling the harvester. The operator is tempted to leave the power takeoff in drive position and stop the forward travel of the tractor and harvester and, while the harvester is running, try to clear it out or remove some obstruction. So it is not unusual for the operator to try to pull a stalk out of a corn harvester and have his hand caught, with serious or fatal results.

So far as I am aware, no safety means adequate to the needs has been provided, although there is an insistent need for protection of the operator, and the rural papers carry repeated accounts of death or injury due to preventable accidents of exactly the type above referred to.

The object of the present invention is to provide a safety system for tractors which will meet the above demand.

I am aware that attempts have been made to provide safety means for tractor operation, but nothing adequate to the situation has appeared. I conceive that if the operator is required to remain in a safe position while the tractor engine is coupled to the driven element, i. e., either the traction wheels or to the machine driven by the power take-off, or both, he cannot normally be injured by the power of the engine. That is to say, my concept is that if he be compelled to stay on his operator's seat or platform above, or away from the moving part which might do him injury, he cannot be endangered by applying the power to the traction wheels or to the harvester or other implement, or to both.

Now the embodiment of my concept in practical form may take a variety of shapes, but the preferred form of the invention herein disclosed and claimed involves interlocking the operator's platform or driving seat or other support with the means for applying the power of the engine to the particular load to be actuated or driven, and a means for stopping the operation of the engine itself. This interlocking of the three aforesaid elements is such that (1) the engine cannot be started unless the operator either occupies the safety position, i. e., the seat, platform, or other special support, or disconnects the engine from all the driven means which might injure the operator, i. e., the traction wheels or drive, or the machine driven by the power take-off;

(2) the engine cannot continue to operate if the operator leaves his safety position and does not previously disconnect all the driven means which might cause him injury, i. e., the traction drive or the power take-off drive;

(3) if the operator disconnects all the means which might cause him injury, he may leave his safety position without stopping the engine.

As an element for detecting the presence or absence of the operator in or from his safety position, the preferred but by no means only suitable element is a depressible seat or platform upon which the weight of the operator is imposed when he occupies the safety position. As a means for detecting the connection or disconnection of the engine to or from the driven means which might cause the operator's injury, the position of the gear shift lever for the traction drive and the clutch lever for the power take-off is the preferable but not the only means.

As a means for stopping the engine, interruption of the operation of the electric ignition is the preferred but not the only means. A suitable electric switch performs this function. Obviously a valve for shutting off the intake of combustion mixture or fuel might be employed to stop the engine. The interlocking relation may take various forms. That is to say, the interlocking may be mechanical, electric, or by other suitable means, or by a combination of means.

In the preferred form herein illustrated, the detecting means for detecting the presence of the operator in safety position is electric switch means operable by a depressible seat and/or platform. The detecting means for detecting the driving or non-driving connection is electric switching means controlled by the position of the gear shift lever or the power take-off clutch lever, or both, and the interlocking means is an electric circuit a predetermined condition of which under the influence of said switching means is essential to firing of the engine.

An alternative form involves mechanical interconnection of the depressible seat and/or platform with the gear shift lever and/or the power take-off clutch, with means for stopping the engine, as a suitable switch, valve, or the like.

It is particularly to be noted that as soon as the engine stops operation, i. e., as soon as the engine stopping means operates, the tractor with its pulled implement stops because of the braking or stopping effect of the load. Hence, just as soon as the operator leaves the safety position by accident or intent, the means which might injure him becomes innocuous even though the governor throttle is wide open. This is in contrast to the operation of a road vehicle under accelerator pedal control wherein the moment the operator's foot leaves the accelerator the engine merely idles but the momentum of the vehicle carries it forward.

The system of my invention interferes not at all with any proper operation of the tractor and its use does not incur the antagonism of the operator. In any system which is troublesome or interferes with normal operation, the incentive to disable, block, or disrupt the safety device always exists, and operators will yield to it. The system of my invention provides safety with no inconvenience to the proper operation of the tractor or the implement or machinery driven thereby.

The means of my invention is simple and inexpensive. It is not easily disabled, blocked or disrupted, and no incentive to do so is caused by its operation. It peculiarly solves the problem of tractor operation where the throttle governor takes charge of the operation of the engine, and to that extent the operator is at the mercy of his tractor.

Now, in order to acquaint those skilled in the art with the manner of constructing and operating my invention, I shall describe, in conjunction with the accompanying drawings which form a part of this specification, a specific embodiment of the invention.

In the drawings:

Figure 1 is a view of a tractor embodying my invention shown drawing an implement;

Figure 2 is a diagram showing an ignition system used in tractors;

Figure 3 is a diagram showing another ignition system used in tractors;

Figure 4 is a view showing the application of the safety device to a tractor employing the ignition circuit of Figure 2 and showing the parts necessary for operating the device;

Figure 5 is a view similar to Figure 4 with the operating parts in alternate positions;

Figures 6 to 13, inclusive, are diagrammatic views of the various conditions of operation of the device shown in Figures 4 and 5;

Figure 6 shows the operator's support unoccupied and the transmission and power take-off in neutral positions;

Figure 7 shows the operator's support occupied and the transmission and power take-off in neutral positions;

Figure 8 shows the operator's support occupied, the transmission in gear position and the power take-off in neutral position;

Figure 9 shows the operator's support unoccupied, the transmission in gear position and the power take-off in neutral position;

Figure 10 shows the operator's support occupied, the transmission in neutral position and the power take-off in gear position;

Figure 11 shows the operator's support unoccupied, the transmission in neutral position and the power take-off in gear position;

Figure 12 shows the operator's support occupied and the transmission and power take-off in gear positions;

Figure 13 shows the operator's support unoccupied and the transmission and power take-off in gear positions;

Figure 14 is a view similar to Figures 4 and 5 showing the application of the safety device to a tractor employing the ignition circuit of Figure 3;

Figures 15 to 22, inclusive, are diagrammatic views showing the various conditions of operation of the safety device shown in Figure 14;

Figure 15 shows the operator's support unoccupied and the transmission and power take-off in neutral positions;

Figure 16 shows the operator's support occupied and the transmission and power take-off in neutral positions;

Figure 17 shows the operator's support occupied, the transmission in gear position and the power take-off in neutral position;

Figure 18 shows the operator's support unoccupied, the transmission in gear position and the power take-off in neutral position;

Figure 19 shows the operator's support occupied, the transmission in neutral position and the power take-off in gear position;

Figure 20 shows the operator's support unoccupied, the transmission in neutral position and the power take-off in gear position;

Figure 21 shows the operator's support occupied and the transmission and power take-off in gear positions;

Figure 22 shows the operator's support unoccupied and the transmission and power take-off in gear positions;

Figures 23 to 26, inclusive, show a modification of the invention applied to a tractor employing the ignition circuit of Figure 2;

Figure 23 shows the operator's support unoccupied and the transmission in neutral position;

Figure 24 shows the operator's support occupied and the transmission in neutral position;

Figure 25 shows the operator's support occupied and the transmission in gear position;

Figure 26 shows the operator's support unoccupied and the transmission in gear position;

Figures 27 to 30, inclusive, show a modification of the invention applied to a tractor employing the ignition circuit of Figure 3;

Figure 27 shows the operator's support unoccupied and the transmission in neutral position;

Figure 28 shows the operator's support occupied and the transmission in neutral position;

Figure 29 shows the operator's support occupied and the transmission in gear position;

Figure 30 shows the operator's support unoccupied and the transmission in gear position; and Figure 31 is a diagrammatic view of a modification of a multiple switch arrangement applied to a tractor employing the ignition circuit of Figure 2.

Figure 1 is a view showing a tractor drawing an implement which is being operated by a power take-off attachment on the tractor. The tractor is shown generally at 1 and shows the essential parts for operating my safety device comprising a gear shift lever 2, a pull rod 4 for operating the power take-off, and a movable platform 5 which is responsive to the weight of the operator. The implement 6 being drawn is a corn binder which is one of the various implements that may be operated by the power take-off attachment on the tractor. A power take-off shaft 7 propels the operating parts of the corn binder, and it will be seen that when the tractor stops, the implement may continue to be operated by the power take-off, as distinguished from an implement which is operated by its own traction. The tractor is provided at its rear end with a hitch to which the implement is connected. The implement being drawn is hitched usually quite close behind the tractor, and if it should happen that the operator is thrown off the tractor in the path of the oncoming implement, it is imperative that the tractor come to a dead stop immediately. A governor is indicated diagrammatically at 8. My invention plays an important part in connection with tractors employing a governor; an important object of the invention is to prevent cranking of the tractor while it is left in gear, and, in the case of a tractor equipped with a governor, at a standstill, the throttle is in wide open position, and if the tractor is cranked in that position it will start up at full speed immediately and be apt to injure the operator.

I have found that one of the most effective ways to stop the tractor is to disable the ignition circuit, since the tractor has no residual power after the ignition has been disabled. In Figure 2 I have shown diagrammatically one form of ignition system commonly employed in tractors. The ignition circuit proper consists of a magneto 9, conductor 10, distributor 11, and spark plugs 12. An auxiliary circuit consists of a conductor 14, switch 16, and a ground connection 17 in shunt of the interrupter 13. In the normal operation of the tractor the switch 16 is open, allowing the ignition circuit to function, and when an unsafe condition exists the switch 16 is closed, completing the auxiliary circuit and shunting the interrupter to disable the main ignition circuit. The switch 16 may be a single switch jointly operated by the operator's support, the transmission, and the power take-off, or it may be a plurality of switches each operated by one of the above mentioned operating parts and so arranged that their cumulative effect is equivalent to the operation of a single switch responsive to those operating parts.

As an alternative, the arrangement shown in Figure 3 may be employed. In this figure, a battery constituting a source of power is indicated generally at 19 and the circuit follows through conductor lead 20, switch 21, induction elements 22, distributor 24, to the spark plugs 25 on the tractor engine. As in the form shown in Figure 2, in this form also the switch 21 may be a single switch operated jointly by the operator's support, the transmission and the power take-off, or it may be a plurality of switches each operated independently by one of the above mentioned operating parts in such manner that their cumulative effect is equivalent to the operation of a single switch jointly operated by those parts. The circuit here shown is the ignition circuit proper of the tractor and the effectiveness of the safety device is accomplished by opening the switch or switches 21 and disabling the ignition circuit.

In Figures 4 and 5 I have shown an embodiment of the device applied to a tractor employing a magneto ignition circuit, as shown in Figure 2, in which the device operates by shunting the ignition circuit. The figure shows only such features as are necessary for a clear understanding of the operation of the device. Reference numeral 26 indicates the engine of a tractor which is equipped with a magneto 9 and a transmission 29. The usual gear shift lever 2 is provided for shifting the transmission to gear and neutral positions. A power take-off gearing is indicated at 31 and is operated from the transmission 29 and is thrown into and out of gear position by the pull rod 4. The power take-off propeller shaft 34 extends from the power take-off gearing rearwardly, and is supported in a bracket 35 mounted on the frame of the tractor and extends outwardly at the rear of the tractor so that an implement may be connected thereto.

A main platform of the type usually provided on tractors is indicated at 36, and is supported at one end by a bracket 37 mounted on the drive shaft housing 38 and supported at its rear end by a similar bracket 40 on the drive shaft housing. Above the main platform 36 is an auxiliary platform 5 which is mounted at the rear portion of the tractor and pivoted at 39 on the main frame 36 and is movable to raised and lowered positions. Beneath the auxiliary platform 5 is a compression spring 41 which reacts between the main platform 36 and the auxiliary platform 5 and biases the latter upwardly to raised position. When the operator's support is unoccupied, the spring 41 holds the platform 5 in raised position, and when the support is occupied the weight of the operator is sufficient to lower the platform 5 against the action of the spring 41. Mounted on the platform 5 is a spring standard 42 which is provided with a seat 44. This seat and the platform are open, that is to say, no protecting cab or framework is provided to help retain the operator on the platform or in the seat. If the operator steps on the platform or sits on the seat, the platform is lowered under his weight, and this constitutes a safe operating position. A conductor lead 45 is connected to the primary ground 15 of the magneto and leads to a switch contact 47 which is mounted on the rear end of the auxiliary platform 5 and insulated therefrom by insulation 49. A contact 50 forming a counterpart of the contact 47 is mounted on the rear end of the tractor frame and is provided with a bent over portion 51 which is adapted to be engaged by the contact 47. Conductor lead 52 leads from contact 50 to contact 54 mounted on the bracket 37 and insulated therefrom by insulation 55. Mounted on the pull rod 4 is a contact 56, from which a conductor 57 leads to ground. The power take-off is shown in neutral position in this figure, and the contact 56 is out of engagement with contact 54. When the power take-off is shifted to gear position, pull rod 4 is raised and the contact 56 is brought into engagement with contact 54.

An extension of the conductor lead 52 leads to a band 59 on the base of the gear shift lever. The band 59 is insulated from the base of the gear shift lever by insulation 60 and is adapted to be contacted by contact fingers 61 when the gear shift lever is shifted into gear position either forwardly or rearwardly. A conductor lead 62 connects the contact fingers 61 to ground.

Particular attention is directed to switch 48 operated by the movement of the operator's platform, switch 53 operated by the movement of the pull rod 4 in shifting the power take-off into and out of gear position, and switch 58 which is operated by the movement of the gear shift lever in shifting the transmission into and out of gear position. Figure 5 is a view similar to Figure 4 but with these three switches each in its alternate position, aside from which the figures are the same. The joint operation of these three switches is the means by which the control device is made effective and ineffective, and for an explanation of the complete cycles of operation of these switches reference is made to Figures 6 to 13, inclusive. Referring again to Figures 4 and 5, it will be seen that the switch 58, operated by the gear shift lever, is open when the transmission is in neutral position as shown in Figure 4, and closed when the transmission is in gear position as shown in Figure 5; the switch 53 is open when the power take-off is in neutral position as shown in Figure 4, and closed when the power take-off is in gear position as shown in Figure 5; and the switch 48 is closed when the operator's support is unoccupied as shown in Figure 4, and open when the support is occupied as shown in Figure 5.

Referring now to Figures 6 to 13, inclusive, these figures show the cycles of operation of the device shown in Figures 4 and 5. These figures show diametrically the control circuit, and it will be seen that the circuit comprises a plurality of switches, when certain ones of which are in predetermined position the control circuit becomes effective. The conductor lead 45 connects the magneto 9 to the switch 48 operated by the operator's support, and conductor lead 52 connects the switch 48 to each of the other two switches, 53 and 58. The switches 53 and 58 are in parallel circuit relation with respect to one another, and the two are in series circuit relation with respect to the switch 48. The switch 48, acting with either one of the switches 53 or 58 will operate to render the control circuit effective. In Figure 6 switch 48 is shown closed, which indicates that the operator's support is unoccupied, and both switches 53 and 58 are open, which indicates that the power take-off and the transmission are in neutral position. In Figure 7 the circuit is shown in the same condition except that the switch 48 is open, which indicates that the operator's support is occupied. This, of course, is a safe operating position since the operator is safely seated on the tractor and the control circuit is open and ineffective. In Figure 8 the switch 48 is also open, which indicates that the operator is safely seated on the tractor, and switch 58 is shown closed, which indicates that the transmission is in gear position. In this position also the control circuit is ineffective since the operator is in control of the tractor. In Figure 9 the switch 58 is shown closed which indicates that the transmission is in gear position and the switch 48 is shown closed also, which indicates that the operator's support is unoccupied. This may happen from the operator being thrown off, and in such an event the tractor must be stopped suddenly to prevent injury to the operator. In this position of the control circuit there is a complete circuit from the magneto to ground, that is, through switch 48 and switch 58, which acts to disable the ignition circuit and stop the tractor immediately. It is, of course, understood that this particular order of operation is not essential to the operation of the safety device since the tractor may be put in gear at a standstill and, if the operator should attempt to crank it, the position of the circuit will be as shown in Figure 9, grounding the ignition circuit and thereby preventing cranking of the tractor. It will be seen therefore that the device operates to stop the tractor if the operator should come into a dangerous position, and also to prevent its being cranked when left in gear.

Figures 10 and 11 show the operation of the device when the power take-off acts in conjunction with the operator's support in operating the safety device. In Figure 10 the switch 53 is shown closed, which indicates that the power take-off is in gear position, and the switch 48 is shown open which indicates that the tractor is occupied; the transmission being left in neutral, the operator may get off the tractor to make an adjustment in the implement being drawn, and if the power take-off is left in gear, this is a dangerous act and, in ordinary cases, the operator may not disconnect the power take-off, thereby subjecting himself to injury. With this device, when the operator leaves the tractor, the switch 48 is closed, as shown in Figure 11, completing the circuit through switch 48 and switch 53, thereby shunting the ignition circuit and stopping the engine.

Figures 12 and 13 show the operation of the device in which both the transmission and the power take-off act in conjunction with the operator's support for operating the control circuit. In Figure 12, the switches 53 and 58 are shown closed, which indicates that the transmission and power take-off are in gear position, and the switch 48 is open, which indicates that the operator's support is occupied; this is, of course, a safe position. In Figure 13, the switch 48 is shown closed, which indicates that the operator's support has become unoccupied and, with the transmission and the power take-off in gear, an unsafe condition exists, and therefore the control circuit becomes operative to disable the ignition circuit.

It will be seen from this description that either the transmission or the power take-off alone may act with the operator's support to render the control circuit effective, or both may act together with the operator's support, but in either case the operator's support must come into play to render the control circuit effective.

Figure 14 shows the safety device applied to a tractor in which the ignition circuit is a battery ignition circuit. The operation of the device is essentially the same as in the previous embodiment, but due to the difference in the ignition circuits the reversion of the operating parts is necessary. In this embodiment the control circuit is in series circuit relation with the ignition circuit and becomes effective by opening the ignition circuit and disabling it, as distinguished from the previous embodiment in which the control circuit acts to shunt the ignition circuit when an unsafe condition prevails. In this figure the parts of the tractor shown are the same as shown in Figures 4 and 5 and the ignition system includes the ignition circuit 64 and a battery 65. On the gear shift lever 2 is an arm 66 comprising a contact which engages another contact 67 constituting a switch 69. The transmission in this figure is shown in neutral position, and in such a position the switch 69 is closed, but when the transmission is shifted either forwardly or rearwardly to gear position, the switch 69 is opened. Switch 70 is operated by the power takeoff pull rod 4 and comprises contact 68 mounted on the pull rod 4 and contact 73 mounted on bracket 37, and is shown in closed position in this figure with the power take-off in neutral position. When the power take-off is shifted to gear position, the switch 70 is opened. Switch 71 is operated by the operator's platform and comprises two contacts 72 and 74, contact 72 being mounted on the operator's platform 5 and insulated therefrom, and contact 74 being mounted on the main platform and insulated therefrom. Conductor lead 75 leads from the ignition circuit to the contact 72, and conductor lead 76 leads from the battery to the contact 74. Conductor lead 77 leads from the conductor lead 75 to the switch 69, through the gear shift lever assembly, conductor lead 79, switch 70, and back through conductor lead 80 to the conductor lead 76. It will be seen that the two switches 69 and 70 are in series circuit relation with each other and the two are in parallel circuit relation with the switch 71. When the switch 71 is closed, it acts directly to close the control circuit and thereby to close the ignition circuit; when the two switches 69 and 70 are both closed, they act to close the control circuit and, consequently, the ignition circuit, but either one of the switches 69 or 70 alone cannot act to close the control circuit; they both must act together. When the operator is on the platform 5 or on the opertor's seat, the switch 71 is closed, and at all times when he is in such a position the control circuit, and consequently the ignition circuit, are closed, allowing the ignition circuit to remain operative. When the operator's support is unoccupied, the circuit is broken through the switch 71 and, in order to close the circuit, both the switches 69 and 70 must be closed; this condition exists only when the transmission and the power take-off are in neutral position, which is, of course, a safe condition. The cycle of operation of this form of control device is shown in Figures 15 to 22, inclusive.

Figures 15 to 22, inclusive, show the positions of the switches 69, 70 and 71 in the operation of the device similar to those shown in Figures 6 to 13, inclusive. In Figure 15 the switches 69 and 70 are closed, which indicates that the transmission and power take-off are both in neutral positions, and the switch 71 is open, which indicates that the operator's support is unoccupied. In this position the control circuit is closed, the ignition circuit consequently being closed, and the tractor may operate normally. In Figure 16 the switch 71 is shown closed, which indicates that the operator's support is occupied; this also is a safe operating position, and the control circuit is closed. In Figure 17 the switch 69 is open, which indicates that the transmission has been shifted to gear position, and since the operator's support is still occupied as indicated by the switch 71 being closed, the control circuit is also closed, allowing the tractor engine to operate. In Figure 18 the switch 71 is shown open, which indicates that the operator has left his seat, which may have been accidentally or deliberately, and in either case the control circuit will come into operation since it is open and will disable the ignition circuit. The operation of the device as shown in these four figures is the same as the operation of the device shown in Figures 6 to 9, inclusive, and it will be seen here also that if it should happen that the tractor be left in gear at a standstill and an attempt be made to crank the tractor, it will be impossible to do so because the control circuit will be open, thereby disabling the ignition circuit.

In Figure 19, the switch 70 is shown open, which indicates that the power take-off is in gear position, and the switch 71 is closed, which indicates that the operator's support is occupied. In Figure 20, the switch 71 is open, which indicates that the operator has left his seat, possibly for the purpose of making an adjjujstment in the implement being operated by the power take-off, and in such event it is necessary for the control device to come into operation. This is accomplished due to the fact that both switches 70 and 71 are open, thus opening the control circuit and disabling the ignition circuit.

In Figures 21 and 22, the same operation as shown in Figures 19 and 20 is shown when the transmission and power take-off are both operated. Figure 21 shows the transmission and the power take-off both in gear position and the operator's support occupied, and the ignition circuit is not disabled; in Figure 22 the switch 71 is shown open, which indicates that the operator's support is unoccupied, and in such position control circuit is opened, thus disabling the ignition circuit. In all conditions, when the operator's support is occupied and the switch 71 is closed, a safe operating position exists and the control circuit does not come into play to disable the ignition circuit, but when the operator's support is unoccupied and either one of the switches 69 or 70 is open, the control circuit operates to disable the ignition circuit. The switch operated by the operator's presence on the tractor may readily be called the master switch because, in all cases, when the operator is in a safe operating position, the tractor engine may operate normally, and if he is not in a safe operating position, the tractor will operate only when both the transmission and power take-off are in neutral positions.

It is obvious from the foregoing that the control device of either form may be applied to a tractor in which either the transmission or the power take-off is used in connection with the operator's support, and it is within the purport and scope of the invention to use either, or both.

In Figures 23 to 30, inclusive, I have shown the application of the two forms of device above described, the only difference being that instead of separate switches being operated by the transmission, the power take-off, and the operator's support, a single switch is used which is responsive jointly to the operation of these parts to the same effect that the separate switches in the previous form are operated. In Figures 23 to 26, inclusive, are shown the form of device which disables the ignition circuit by shunting the magneto ignition circuit. In Figures 27 to 30, inclusive, is shown a control circuit in series circuit relation with the ignition circuit which operates by opening the ignition circuit. These two forms of device are operated exactly as the two forms previously described, these forms being modified to fit a particular adaptation.

In Figures 23 to 26, inclusive, only so much of the structure of the tractor as is necessary to support the operating parts of the safety device is shown, being similar to that shown in Figure 4.

Reference numeral 81 indicates the main platform of a tractor on which the operator may stand and on which the operator's support is usually mounted and is formed as a part of the frame of the tractor. Mounted on platform 81 is an auxiliary platform 82 which is positioned at the rear of the platform 81 and extends forwardly a considerable distance sufficient for an operator to have space to stand on. The platform 82 is pivoted at 84 in a stud 85 which is formed integrally with the platform 81. The platform 82 is movable to raised and lowered positions about the pivot 84 and is normally in raised position as shown in Figure 23, being biased to raised position by means of a compression spring 86 which reacts between the platform 82 and the platform 81, and is held in place by a shank 87 about which the spring is placed. This spring is strong enough to hold the platform 82 in raised position when it is unoccupied, but it is easily compressed by the weight of the operator when he steps on the platform or sits on the operator's seat. Mounted on the platform 82 is a standard 89 which is rigidly secured thereto and movable therewith, and which supports a seat for the operator. It is therefore seen that when the operator steps on the platform or sits on the seat, the platform 82 will be lowered against the action of the spring 86 and will rest solidly on the main platform 81.

A bell crank lever 90 is pivoted on the tractor frame at 91 and comprises a downwardly extending arm 92 and a horizontally and rearwardly extending arm 94. Pivoted on the horizontally extending arm 94 is a link 95, the other end of which is pivoted at 98 on an extension 96 of the platform 82. Pivoted to the downwardly extending arm 92 is a link 97 which extends forwardly some distance, the forward end of which is adapted to operate a power disabling means on the tractor and which is also controlled by the gear shift lever and the power take-off lever.

Reference numeral 99 indicates a mounting plate or block upon which lever arms 100 and 101 are pivoted at 102 and 104, respectively. This plate or block is of convenient size and shape and mounted on the tractor frame, or it may be that the lever arms 100 and 101 are pivoted directly on the frame. The forward end of the link 97 is provided with a slot 105 through which a projection 106 on the lever arm 100 and a projection 107 on the lever arm 101 extend. These projections hold the link 97 in position, and the slot is of sufficient length that the link 97 may move horizontally with respect to the lever arms 100 and 101.

A transmission gear shift lever 109 of the usual type is supplied and is pivotally mounted in the base 110. About the lower end of the lever 109 is a collar 111 with a laterally extending ear 112. A link 114 is pivoted at one end in the ear 112 and at the other end in the upper end of lever arm 100. Upon shifting the lever 109 into gear position, either forwardly or rearwardly, the link 114 is shifted forwardly or rearwardly therewith and the lever 100 is rocked to corresponding positions.

A power take-off lever 115, similar to the lever 109, is pivoted in a base 116. About the lower end of the lever 115 is a collar 117 with a laterally extending ear 118. A link 119 is pivoted at one end in the ear 118 and at the other end in the upper end of the lever arm 101. Upon shifting the lever 115 into gear position, the link 119 is shifted therewith and the lever arm 101 is rocked to a corresponding position.

Mounted on the plate 96 is a post 120 which is insulated from the plate and is adapted for connection with a conductor lead 121 from the primary ground post of the magneto which supplies the ignition power for the tractor. Secured to the end of the link 97 is a contact finger 122 which is adapted to engage post 120 in certain positions of the link 97, and leading from the contact finger 122 is a lead 124 connecting it to ground. When the contact finger 122 is in engagement with the post 120, there is a closed circuit from the primary ground post on the magneto to ground which acts to shunt the magneto ignition circuit and disable it.

Figure 23 shows the tractor unoccupied and with the transmission in neutral position; the platform is in raised position and the bell crank lever 90 is turned counterclockwise and the link 97 is drawn back. The contact finger 122 is so designed that, with the link 97 in the position shown in this figure, it is out of contact with the post 120.

Figure 24 shows the position of the platform 82 when it is occupied. In this position, the weight of the operator forces the platform 82 downwardly into firm contact with the main platform 81, and in this position the bell crank lever 90 is turned clockwise under the action of the platform 82 and the link 97 is moved forward. In both these positions, i. e., Figure 23 and Figure 24, the vertical position of the link 97 is unaltered since in both instances the transmission is in neutral position and consequently the lever 100 does not affect the position of the link 97. In this position also the contact finger 122 is out of engagement with the post 120.

The next position of the operating parts is shown in Figure 25. After the operator is seated in place on the tractor, the transmission may be shifted safely to gear position. When this is done, the motion of the lever 109 moves the link 114 with it and thereby rocks the lever 100 one way or the other, depending upon which direction the lever is moved. When the lever 100 is rocked, the pivot 102 remaining stationary, the lower end rises and carries with it the forward end of the link 97. The contact finger 122 remains out of contact with the post 120 in this position and is upwardly extended on a level with the post 120 and is adapted to contact the post on rearward motion of the link 97. This motion is completed when the operator leaves the platform 82 when the tractor transmission is in gear and as shown in Figure 26. The link 97 is still maintained in elevated position by means of the lever arm 100, and if the operator should fall or be thrown off the tractor, the platform 82 will be raised by the action of the spring 86, the bell crank lever 90 rotated counterclockwise, and the link 97 moved back. The contact finger 122 then comes into contact with the post 120 as shown in Figure 26.

This series of figures, 23 to 26 inclusive, shows the various positions which are safe for the operator and which are not. The unsafe position as shown in Figure 26 is the one for which my safety control is particularly designed. In usual types of tractors, while the tractor is in motion, if the operator shall fall or be thrown off, there is nothing to stop the forward progress of the tractor, but when the tractor is equipped with my safety control device, it will be stopped immediately upon occurrence of such a condition.

In all conditions when the operator is in a safe position, the contact finger 122 is out of engagement with the post 120 and the ignition circuit operates normally. These conditions exist whenever the operator is safely seated on the operator's seat or when the transmission is in neutral position. In the one condition—when the operator is not on the operator's seat and the transmission is in gear position—the contact finger 122 is in engagement with the post 120, completing the shunt circuit from the magneto circuit to ground, thus disabling the ignition circuit.

It is, of course, understood that this order of operation is not essential for the operation of my safety control; for instance, it may be that the tractor is standing idle and the transmission is shifted to gear position without the operator being safely seated on the tractor. If it is attempted to crank the tractor in such a position, it will be impossible to do so because the contact finger 122 will be in engagement with the post 120 and the ignition circuit will be disabled. It is, therefore, obvious that the safety device operates in a twofold manner; it stops the tractor if the operator should be thrown off while driving it and, also, it prevents its being cranked when left in gear position.

In Figures 23 to 26, inclusive, a cycle of operation of the device is shown in which the transmission shifting lever acts in conjunction with the operator's support for rendering the control circuit operative or inoperative. This is shown with the power take-off in neutral position in all positions of the transmission. Either the transmission lever or the power take-off lever may be shifted without interference from the other. The lever arms 100 and 101 both operate in the slot 105 in the link 97, and when one is rocked the link 97 will be carried upwardly with it and the slot 105 has a vertical dimension great enough that its upward movement will not be checked by the other lever arm. This position is shown in Figures 25 and 26, in which the lever arm 100 is rocked, holding the link 97 in raised position while the lever arm 101 is in vertical position. While this series of figures shows the operation of the device through various positions of the transmission lever, the same operation takes place through similar positions of the power take-off lever; and this is true in all cases when the transmission is in neutral position. Obviously the same operation takes place when both the transmission lever and the power take-off lever are operated.

Figures 27, 28, 29, and 30 show the form of device of Figure 14 applied in a manner similar to that shown in Figures 23, 24, 25, and 26. In the present embodiment, the control circuit is in series with the ignition system and the ignition system operates normally when the control circuit, which acts as an ignition disabling means is closed, but is disabled when the control circuit is open. The ignition circuit of the tractor is indicated diagrammatically at 125 and the control circuit for disabling the ignition circuit consists of a conductor lead 126 which is connected to a post 127 electrically connected with the contact 129 and a conductor lead 130 which leads to contact finger 122. In this embodiment as in the previous embodiment, a supporting block 99 is provided. Link 97 is operated by the movement of the platform 82 and link 114 is operated by the movement of the lever 109. Contact 129 is of L-shape and mounted on the block 99, and is insulated therefrom. The contact finger 122 is adapted to engage contact 129 in various positions along its outwardly extending legs, and in the space between the outwardly extending legs is a block of insulation 131. When the safety control device operates, the contact finger 122 moves off of the contact 129 and onto the block of insulation 131, thus opening the control circuit and disabling the ignition circuit.

The steps of the operation of the device are shown progressively in these figures, Figure 27 showing the condition which exists when the tractor is unoccupied and the transmission is in neutral position. As in the previous embodiment, the link 97 is drawn back when the platform 82 is unoccupied and raised, drawing with it the contact finger 122. In this position, the forward end of link 97 is in lowered position and the contact finger 122 is in engagement with the contact 129 at a point on its lower extended arm. Figure 28 shows the position of the link 97 when the tractor is occupied. It will be seen here that the link 97 is moved forwardly and the contact finger 122 remains in contact with the contact 129. In this position, a condition of safety exists; that is, the operator is safely seated upon the tractor. Figure 29 shows the position of the operating parts at the next step; that is, when the operator is safely seated on the tractor and the transmission is shifted to gear position. The link 97 remains extended forwardly, and as the transmission is shifted to gear position, the lever 100 is rocked, raising the lower end thereof and consequently raising the forward end of the link 97. When this takes place, the contact finger 122 is raised along the upwardly extending leg of the contact 129 and remains in contact therewith. Figure 30 shows the condition of danger and in which the safety device will operate to disable the ignition circuit. In this position the forward end of the link 97 remains raised since it is held in raised position by the lever 100. This indicates gear position of the transmission, and if the operator should be thrown off, the platform 82 is raised and the link 97 is drawn back.

When the contact finger 122 is moved rearwardly from its forward, elevated position, it moves onto the block of insulation 131 and out of engagement with the contact 129, thus opening the control circuit and disabling the ignition circuit.

If it should happen that the transmission be shifted to gear position when the tractor is standing idle and unoccupied, the contact finger 122 moves from the position of Figure 27 to the position of Figure 30, out of contact with the contact 129 and onto the block of insulation 131. Thus, the tractor cannot be cranked when it is in gear position because in that position the ignition circuit is disabled.

What was said in connection with Figures 23 to 26, concerning the independent action of the transmission lever and the power take-off lever, may be said also in connection with Figures 27 to 30. Lever arm 101 is rocked by power take-off lever 115 through link 119 and thereby actuates the link 97. Each lever arm 100 and 101 can operate independently of the other and without interference from the other, and although the series of operations shown in these figures shows the operation of the device in various positions of the transmission lever, the operation would be exactly the same through similar positions of the power take-off lever. Of course, the same result would occur when both are operated.

Figure 31 shows a slight variation of the form of the invention shown in Figures 4 and 5. The figure shows a circuit adapted to shunt the magneto ignition circuit when the operator's platform, the operator's seat, the power take-off shift lever and the transmission shift lever are in predetermined positions. It is contemplated that in the use of my invention a safe operating position may consist in either sitting on the seat or standing on the platform and to this end I intend to include, as an alternative to the form shown previously, separate switches controlled by the operator's seat and the operator's platform.

In this form the circuit includes a switch 132 controlled by the operator's platform, another switch 134 by the operator's seat, and two additional switches, one controlled by the power take-off lever 115 and the other by the gear shift lever 109. The two shift levers 115 and 109 are each provided with a band 135 surrounding and insulated from the base 136 and contact fingers 137 which are secured on the shift levers in electrical engagement therewith and adapted to engage the bands 135. The bands 135 and the respective contact fingers form switches controlled by the shift levers. When the shift levers are in neutral positions as shown the switches are open, but when either lever is shifted to gear position, either forwardly or rearwardly, its respective switch is closed.

Conductor lead 139 is connected to the primary ground post 15 of the usual magneto 9 and leads therefrom to the switch 132 controlled by the operator's platform; conductor lead 140 leads from the switch 132 to the switch 134 controlled by the operator's seat. Continuing from the switch 134 is a conductor lead 141 which connects with the bands 135 on the bases of the shift levers and from each of the shift levers is a conductor 142 leading to ground. The switches controlled by the shift levers are in parallel circuit relation with each other and the two are in series circuit relation with the switch 132 and the switch 134. When both the switches 132 and 134 are closed and either one of the switches controlled by the shift levers is closed the circuit is closed and shunts the ignition circuit. When the operator is on the tractor either the switch 132 or the switch 134 will be open, but if the tractor becomes unoccupied when either of the shift levers is in gear the ignition circuit will be disabled.

It is of course obvious that the control circuit here shown can easily be adapted to use with only one shift lever, as either will operate the control circuit without interference from the other.

I intend that the details herein shown and described shall not be limiting, but illustrative, and that all arrangements of parts to meet particular adaptations, and substitution of equivalents shall be within the scope of the appended claims.

I claim:

1. In a safety system for a tractor having an internal combustion engine operating under automatic governor control, the combination of an ignition disabling device, a plurality of power transmitting mechanisms movable to gear positions and to neutral positions, a movable support for supporting the operator and movable under the weight of the operator, and a control member responsive jointly to the movements of said power transmitting mechanisms and said movable support for operating said ignition disabling device.

2. In a safety system for a tractor having an internal combustion engine operating under automatic governor control, the combination of a normally inactive ignition disabling device, a plurality of power transmitting mechanisms movable to gear positions and to neutral positions, a movable support for supporting the operator and movable under the weight of the operator, and a control member responsive jointly to the movements of said power transmitting mechanisms and said movable support and operable to actuate said ignition disabling means when said movable support is unoccupied and either of said power transmitting mechanisms is in gear position.

3. In a safety system for a tractor having an internal combustion engine operating under automatic governor control, the combination of an ignition disabling device, a plurality of power transmitting mechanisms movable to gear positions and to neutral positions, a movable support for supporting the operator and movable under the weight of the operator, and a control member responsive jointly to the movements of said power transmitting mechanisms and said movable support for operating said ignition disabling means, said control member being inoperative when said movable support is occupied in any position of said power transmitting mechanisms.

4. In a safety system for a tractor having an internal combustion engine operating under automatic governor control, the combination of an ignition disabling device, a plurality of power transmitting mechanisms movable to gear positions and to neutral positions, a movable support for supporting the operator and movable under the weight of the operator, and a control member responsive jointly to the movements of said power transmitting mechanisms and said movable support for operating said ignition disabling means, said control member being inoperative when said power transmitting mechanisms are in neutral positions in any position of said movable support.

5. Safety means for a tractor having an ignition circuit and a plurality of power transmitting mechanisms, in combination a control circuit connecting said ignition circuit to ground, and a plurality of switches in series circuit relationship in said control circuit, one of said switches adapted to be operated by each power transmitting mechanism, another of said switches adapted to be operated by the operator's seat of the tractor, said control circuit remaining inoperative except when either of said power transmitting mechanisms is in gear and the operator's seat is unoccupied.

6. Safety means for a tractor having an ignition circuit comprising a control circuit having a plurality of switches in series circuit relationship, one of said switches adapted to be actuated by the operator's platform and controlled by the operator's presence thereon, another of said switches adapted to be operated by the operator's seat and controlled by the operator's presence thereon, one of said switches remaining open and rendering the control circuit inoperative when the operator is in a safe operating position.

7. Safety means for a tractor having an ignition circuit, comprising a transmission having control means, a support for the operator movable under the weight of the operator, a control circuit connecting said ignition circuit to ground, and a switch for opening and closing said control circuit, said switch being responsive to the position of said transmission control means and the movements of said movable support and being open except when said transmission control means is in position corresponding to drive through the transmission and said movable support is unoccupied.

8. A safety device for shunting the ignition circuit of a tractor, comprising transmission means having in gear and out of gear positions, a control circuit connecting the ignition circuit to ground, two switches in said control circuit, a support movable under the weight of the operator for supporting the operator, one of said switches being closed when said transmission means is in gear position, the other of said switches being open when the support is occupied by the operator, said control circuit being adapted to shunt said ignition circuit when both of said switches are closed, and automatic means for closing said second-mentioned switch when said movable support becomes unoccupied.

9. Safety means for a tractor having an ignition circuit and a plurality of power transmitting mechanisms, comprising a control circuit having a plurality of switches and adapted to disable said ignition circuit, and a movable support for supporting the operator and movable under the weight of the operator, one of said switches adapted to be operated by the movements of each of said power transmitting mechanisms into and out of gear positions, and another of said switches adapted to be operated by the movements of said movable support, said control circuit being operative when either of said power transmitting mechanisms is in gear position and said movable support is unoccupied.

10. Safety control means for a tractor, comprising a plurality of power transmitting mechanisms, power disabling means, a movable support for supporting the operator of the tractor and movable under the weight of the operator, and a movable member responsive jointly to the movements of said power transmitting mechanisms and said movable support and operable to operate said power disabling means when any of said power transmitting mechanisms is in gear position and said movable support is unoccupied.

11. Safety control means for a tractor, comprising a plurality of power transmitting mechanisms, power disabling means, a movable support for supporting the operator of the tractor and movable under the weight of the operator, and a movable member responsive to the movements of said movable support and operable thereby to operate said power disabling means when any of said power transmitting mechanisms is in gear position.

12. Safety control means for a tractor, comprising a plurality of power transmitting mechanisms, power disabling means, a movable support for supporting the operator of the tractor and movable under the weight of the operator, and a movable member responsive to the movements of said power transmitting mechanisms and operable thereby to operate said power disabling means when said movable support is unoccupied.

13. Safety control means for a tractor, comprising a plurality of power transmitting mechanisms, power disabling means, a movable support for supporting the operator of the tractor and movable under the weight of the operator, and a movable member responsive jointly to the movements of said power transmitting mechanisms and said movable support and adapted thereby to operate said power disabling means, said movable member being ineffective when said movable support is occupied in any position of any of said power transmitting mechanisms.

14. Safety control means for a tractor, comprising a plurality of power transmitting mechanisms, power disabling means, a movable support for supporting the operator of the tractor and movable under the weight of the operator, and a movable member responsive jointly to the movements of said power transmitting mechanisms and said movable support and adapted thereby to operate said power disabling means, said movable member being ineffective when both of said power transmitting mechanisms are in neutral position in any position of said movable support.

15. Safety control means for a tractor, comprising a plurality of power transmitting mechanisms, a control circuit for disabling the ignition circuit of the tractor, a switch in said control circuit, said control circuit being operative when said switch is closed, a movable support for supporting the operator of the tractor and movable under the weight of the operator, and a movable member on which one of the contacts of said switch is mounted, said movable member being movable longitudinally in response to the movements of said movable support and movable vertically in response to the movements of any of said power transmitting mechanisms, the contacts of said switch being in engagement when said movable support is unoccupied and any of said power transmitting mechanisms is in gear position.

16. Safety control means for a tractor, comprising a plurality of power transmitting mechanisms, a control circuit for disabling the ignition circuit of the tractor, a switch in said control circuit, said control circuit being operative when said switch is open, a movable support for supporting the operator of the tractor and movable under the weight of the operator, and a movable member on which one of the contacts of said switch is mounted, said movable member being movable longitudinally in response to the movements of said movable support and movable vertically in response to the movements of any of said power transmitting mechanisms, the contacts of said switch being out of engagement when said movable support is unoccupied and any of said power transmitting mechanisms is in gear position.

17. In a farm type tractor the combination with an internal combustion engine, a transmission having a gear shift lever, driving wheels driven through the transmission, said engine having an automatic throttle governor for maintaining a predetermined speed of the engine under varying load, the throttle being wide open at zero speed of the engine whereby if the operator cranks the engine while the transmission is in gear the tractor will tend to leap upon him and crush him, an open and unguarded seat for the operator mounted on a spring stem at the rear of the tractor, a dead load earth working implement hitched to the rear of the tractor and drawn a short distance behind the tractor whereby the implement would tend to run over the operator before he could get up in case he falls off the seat, the unguarded character of the seat in conjunction with the recoil of the spring seat support upon a wheel of the tractor striking an obstruction and the tractor at the same time tilting sidewise, tending to throw the operator out of the seat and onto the ground in front of the oncoming implement, a safety system comprising ignition disabling means for the engine, said means having an element responsive to the position of the gear shift lever and an element responsive to the weight of the operator upon said seat, said elements cooperating when the gear shift lever is in in-gear position and the seat is free of the weight of the operator to render said ignition disabling means active to stop the engine if running and to prevent it being started if not running.

18. In a tractor of the type adapted to draw a power operated agricultural implement back of it and to operate the implement, said tractor having a driving engine, a transmission for the driving of the tractor, and a power takeoff for the power operated implement, the combination of an operator's support at the rear of the tractor, said support being yieldably depressed by the weight of the operator occupying the same, a control element responsive to the raised or depressed position of said support, a shifting member for said power takeoff having a driving and a non-driving position, a control element responsive to the driving and non-driving position of said shifting member, and means governed by said control elements to stop the operation of the engine when the operator's support is in raised position and the shifting member is in driving position.

19. In a farm type tractor having an electrically ignited internal combustion engine, driving wheels and a selective gear transmission from the engine to the driving wheels and having an automatic speed governor, said tractor having a rear hitch for pulling an agricultural implement behind the tractor, the combination of an operator's unguarded seat located at the rear of the tractor from which it is possible for him to fall in front of the oncoming implement, said seat being depressible by the weight of the operator, a control element responsive to the raised or depressed position of said seat, a gear shift lever for the transmission having in-gear and neutral positions, a control element responsive to the in-gear and neutral positions of said gear shift lever, and an electric circuit having switching means controlled by said control elements to disable the electric ignition when the seat is in raised position and the gear shift lever is in gear position.

20. In a tractor having an engine provided with electric ignition, driving wheels and a transmission between the engine and wheels, the combination of a switch controlling the electric ignition, said switch having two positions, said switch in one position disabling the electric ignition, an open seat for the operator disposed at the rear of the tractor, resilient means for holding said seat in raised position, said seat being depressed by the weight of the operator when he occupies the seat, a transmission control element having an in-gear and an out-of-gear position, and a linkage actuated jointly by the transmission control element and the seat to put the switch in position to disable the electric ignition when the transmission control element is in in-gear position and the seat is in raised position.

21. In a tractor having an engine, an electric circuit including a switch movable to a predetermined circuit controlling position to stop the engine, a transmission with a shifting member, a movable seat depressible by the weight of the operator, and resilient means for raising the seat, and a linkage operable jointly by the shifting member and by the seat for moving the switch to stop the engine when the shifting member is in in-gear position and the seat is raised.

22. In a tractor, a frame, an engine, a transmission, a gear shift lever having neutral and in-gear positions, a platform at the rear of the frame, an open seat carried on the platform whereby the platform may support the operator in either seated or standing position, said platform being pivoted to the frame, spring means for automatically raising the platform when the weight of the operator is removed therefrom, and engine stopping means controlled by the platform and the gear shift lever to stop the engine when the platform is raised and the gear shift lever is in in-gear position.

CLARENCE H. DOOLEY.